United States Patent
Nusbaum

(10) Patent No.: US 10,658,824 B2
(45) Date of Patent: May 19, 2020

(54) METHOD AND APPARATUS FOR REMOVING A CABLE CORE FROM A CABLE SHEATH

(71) Applicant: DEFLUX HOLDINGS LIMITED, Somerset (GB)

(72) Inventor: Laslo Nusbaum, Wulkaprodersdorf (AT)

(73) Assignee: DEFLUX HOLDINGS LIMITED, Somerset (GB)

( * ) Notice: Subject to any disclaimer, the term of this patent is extended or adjusted under 35 U.S.C. 154(b) by 241 days.

(21) Appl. No.: 15/112,040

(22) PCT Filed: Jan. 15, 2015

(86) PCT No.: PCT/GB2015/050075
§ 371 (c)(1),
(2) Date: Jul. 15, 2016

(87) PCT Pub. No.: WO2015/107348
PCT Pub. Date: Jul. 23, 2015

(65) Prior Publication Data
US 2016/0336725 A1 Nov. 17, 2016

(30) Foreign Application Priority Data
Jan. 17, 2014 (GB) .................................. 1400816.3

(51) Int. Cl.
*H02G 1/08* (2006.01)
*H02G 1/12* (2006.01)

(52) U.S. Cl.
CPC .......... *H02G 1/1297* (2013.01); *H02G 1/081* (2013.01); *H02G 1/086* (2013.01)

(58) Field of Classification Search
CPC .......... H02G 1/1297; H02G 1/08; H02G 1/18; H02G 1/12; H02G 1/00; H02G 9/00; H01B 15/00
(Continued)

(56) References Cited

U.S. PATENT DOCUMENTS 3,832,767 A * 9/1974 Petree ...................... H02G 1/12
29/867
4,174,875 A * 11/1979 Wilson ................. H01R 13/523
439/349

(Continued)

FOREIGN PATENT DOCUMENTS

| CA | 1195097 | 10/1985 |
| EP | 0038789 A | 10/1981 |

(Continued)

OTHER PUBLICATIONS

Search Report for corresponding British Patent Application No. GB 1400816.3 dated Jul. 14, 2014.
(Continued)

*Primary Examiner* — Peter Dungba Vo
*Assistant Examiner* — Kaying Kue
(74) *Attorney, Agent, or Firm* — Nelson Mullins Riley & Scarborough LLP

(57) ABSTRACT

Apparatus and method for extracting the core and surrounding insulator from an outer sheath of a length of data transmission cable is disclosed. The apparatus comprises a pump operable to generate hydraulic pressure against one end of the core and insulator, and a drawing mechanism operable to simultaneously exert a pulling force on an opposite end of the core and insulator. The arrangement being such that hydraulic pressure applied to one end, and pulling force applied to the opposite end, together displace the core and insulator relative to its outer sheath.

7 Claims, 2 Drawing Sheets

(58) Field of Classification Search
USPC .................................. 29/700, 762, 244, 828
See application file for complete search history.

(56) References Cited

U.S. PATENT DOCUMENTS

| | | | | |
|---|---|---|---|---|
| 4,185,809 | A | * | 1/1980 | Jonnes .................... B66F 19/00 |
| | | | | 254/134.4 |
| 4,197,628 | A | * | 4/1980 | Conti ....................... H02G 1/08 |
| | | | | 29/234 |
| 4,272,155 | A | * | 6/1981 | Slaughter ............... G02B 6/441 |
| | | | | 385/101 |
| 4,334,943 | A | * | 6/1982 | Zenbayashi ............. B29C 63/36 |
| | | | | 138/97 |
| 5,027,864 | A | * | 7/1991 | Conti ................... G02B 6/4459 |
| | | | | 138/108 |
| 5,121,901 | A | * | 6/1992 | Cassidy ............... G02B 6/4438 |
| | | | | 254/134.3 FT |
| 5,813,658 | A | * | 9/1998 | Kaminski ............... B65H 51/14 |
| | | | | 254/134.4 |
| 5,884,384 | A | * | 3/1999 | Griffioen ................. F16L 1/028 |
| | | | | 226/97.1 |
| 5,950,298 | A | * | 9/1999 | Griffioen ................. H02G 1/08 |
| | | | | 242/470 |
| 6,089,546 | A | * | 7/2000 | Griffioen .............. G02B 6/4464 |
| | | | | 254/134.4 |
| 7,814,654 | B2 | | 10/2010 | Pichler |
| 7,814,659 | B2 | | 10/2010 | Matsuda et al. |
| 9,687,918 | B2 | * | 6/2017 | Burris ....................... G02B 6/46 |
| 2004/0117964 | A1 | * | 6/2004 | Pichler ..................... H02G 1/14 |
| | | | | 29/426.5 |
| 2005/0036843 | A1 | * | 2/2005 | Trichard .................. H02G 1/08 |
| | | | | 405/183.5 |
| 2007/0209203 | A1 | * | 9/2007 | McCullough ............ H02G 1/04 |
| | | | | 29/869 |
| 2010/0178020 | A1 | * | 7/2010 | Griffioen ............. G02B 6/4457 |
| | | | | 385/135 |
| 2012/0012386 | A1 | * | 1/2012 | Thomas ................. H02G 1/086 |
| | | | | 174/71 R |
| 2012/0263540 | A1 | * | 10/2012 | Berg ...................... G02B 6/506 |
| | | | | 405/166 |
| 2018/0331517 | A1 | * | 11/2018 | Parker ...................... H02G 1/08 |

FOREIGN PATENT DOCUMENTS

| | | |
|---|---|---|
| GB | 2479788 A | 10/2011 |
| WO | WO 2010/025489 A1 | 3/2010 |
| WO | WO 2011/037445 | 3/2011 |
| WO | WO 2015/052222 A1 | 4/2015 |

OTHER PUBLICATIONS

International Search Report for International Application PCT/GB2015/050075; dated Apr. 16, 2015.

* cited by examiner

METHOD AND APPARATUS FOR REMOVING A CABLE CORE FROM A CABLE SHEATH

The present invention relates to a method and apparatus for removing a cable core from a cable sheath.

Figure 1:
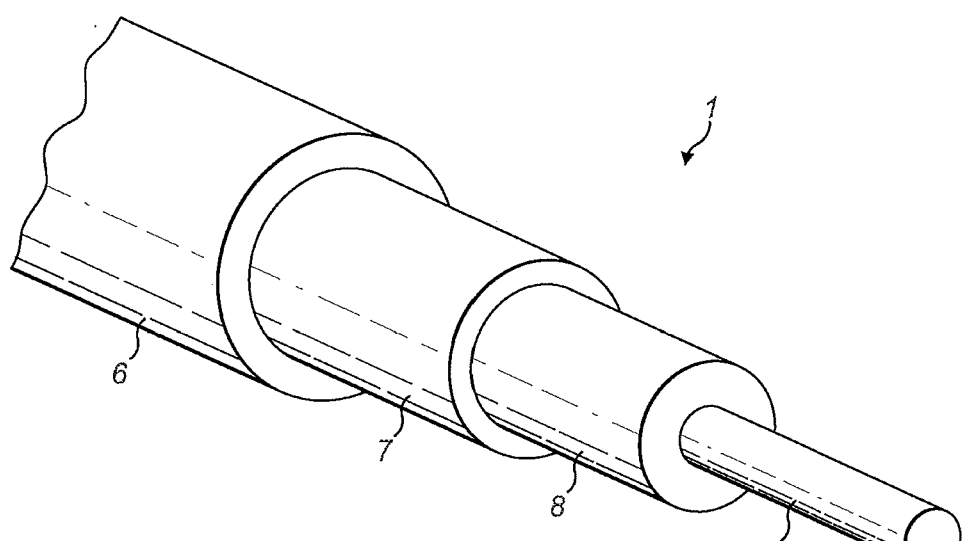

Data, digital or coaxial transmission cables for transmitting data and digital signals into homes have been used for many years and are usually buried underground, often beneath pavements and the front gardens of the homes to which data is being supplied. There are various different cables commonly in use, but a typical cable 1 is shown in FIG. 1 and generally comprises a core 2 formed from a single conductor. The core 2 is received in an outer sheath 6 to provide overall mechanical, weather, chemical and electrical protection. The sheath 6 can be formed from PVC and can be lined with a metallic, e.g. copper, inner jacket 7. An insulator 8 extends between the inner jacket and the core 2 and surrounds the core 2. Although in some cable types the insulator 8 is formed from a soft polymeric material, the type of cable 1 to which the present invention is directed is those in which the insulator 8 is formed from a relatively hard polymer. The insulator 8 serves to provide protection and support for the core 2 and to insulate it from the metal jacket 8.

Developments in technology, together with demand for better and faster data transfer, have recently necessitated the use of optical fibres for data transmission purposes, as optical fibre is capable of transmitting much larger quantities of data at high speed relative to traditional copper cored cables. Where optical fibre is required, the standard approach is to disconnect the existing cable and to lay an entirely new cable containing the optical fibre, with the old disconnected copper cored cable either being removed altogether or left in the ground. It will be appreciated that this approach necessitates the digging of a trench in order to lay the new cable, which is disruptive, time consuming and expensive.

U.S. Pat. No. 7,814,654B2 discloses a method for removing a cable core from an outer cable sheath so that the optical fibre can be fed through the vacated outer cable sheath without having to dig a trench. In the method described in this document, a flowable medium is introduced under pressure into an annular space between the core and the sheath, so as to reduce friction between the core and the sheath to the extent necessary to allow the core to be drawn out of the sheath for subsequent insertion of the new optical fibre. However, this method is troublesome as it requires a supply of pressurised medium and a pump capable of pumping the pressurised medium along a length of cable. Furthermore, it is necessary to minimise leakage and to provide means for collecting the pressurised medium after the core has been released to prevent contamination of the surrounding ground.

In their co-pending UK application No. 1317800.9, the present applicant has described an apparatus and method for removing a cable core from a cable sheath of a particular cable type in which the core is surrounded by an insulator formed by a relatively soft polymer filler material. The Applicant determined that, by supplying voltage along the core, sufficient heat can be generated to reduce the viscosity of the soft polymer material to a point at which the friction between the core and the sheath is low enough to enable the core to be extracted from its sheath by pulling it from one end, thereby avoiding the need to pump fluid along the cable. However, whilst this technique has proven to be effective in the removal of the core from cable types having a soft polymer insulator whose viscosity readily reduces on the application of a relatively small increase in temperature, it cannot be used when the cable has an insulator formed from a hard polymer, as the temperature cannot be increased to a point at which the hard plastic is softened sufficiently to enable the core to be extracted without also causing irreversible damage to the sheath.

The present invention seeks to provide a method and apparatus which substantially overcomes or alleviates problems associated with the removal of a cable core from a sheath for use with a cable of a type in which the core is surrounded by a relatively hard plastic insulator.

According to the invention, there is provided an apparatus for extracting the core and surrounding insulator from an outer sheath of a length of data transmission cable, comprising a pump operable to generate hydraulic pressure against one end of the core and insulator, and a drawing mechanism operable to simultaneously exert a pulling force on an opposite end of the core and insulator, the arrangement being such that hydraulic pressure applied to one end and pulling force applied to the opposite end together displace the core and insulator relative to its outer sheath.

In a preferred embodiment, a coupling sleeve is fixedly mountable to the outer sheath adjacent to one end of the cable. The pump may comprising a pressurised fluid supply pipe having a coupling releasably attachable to the coupling sleeve so that pressurised fluid pumped along said pipe acts directly against one end of the core and insulator at said end of the cable.

The coupling sleeve and coupling may comprise complementary screw threads for releasable engagement with each other. A sealing element may be provided to form a liquid tight seal between the coupling sleeve and the coupling to prevent loss of pressurised fluid.

Preferably, the pump is a constant pressure pump or a pneumatic pump. The pump may be configured to pump pressurised fluid at a fluid pressure of up to 70 bar and, preferably, at a pressure in the region of 45 bar.

In a preferred embodiment, the apparatus comprises a clamping member to clamp an end portion of the core and insulator exposed at an opposite end of the cable, the clamping member having a cooperating element for attachment to a drawing mechanism.

The drawing mechanism may comprise a winch having a wire rope. The rope may have a hook at its free end for attachment to the cooperating member that forms part of the clamping member.

In a preferred embodiment, the winch is configured to apply a pulling force of up to 170 kg to the insulator and core via the clamping member. The winch may include a load meter to provide a measurement of the load being applied to the insulator and core.

The apparatus may comprise a controller to reduce the pulling force applied to the insulator and core via the clamping member after movement of the insulator and the core has been initiated. The controller may be automatic or user-operated.

In some embodiments, a control unit may be provided to activate the pump and the drawing mechanism and also to control the pulling force generated by the drawing mechanism under a constant pressure generated by the pump once it has been activated. The control unit may be in the same location or controls for the pump and drawing mechanism may be in separate locations. For example, each of the pump and the drawing mechanism may be provided with its own control unit.

According to the present invention, there is also provided a method for extracting the core and surrounding insulator from an outer sheath of a length of data transmission cable, comprising the act of generating hydraulic pressure against one end of the core and insulator, and simultaneously exerting a pulling force on an opposite end of the core and insulator to displace the core and insulator relative to its outer sheath.

The method preferably includes the act of fixedly mounting a coupling sleeve to the outer sheath adjacent to one end of the cable and releasably attaching a coupling of a pressurised fluid supply pipe to the coupling sleeve prior to pumping pressurised fluid along said pipe so that it acts directly against the core and insulator at said end.

The method may also include the step of sealing the core and insulator at said end prior to releasably attaching said coupling to the coupling sleeve prevent pressurised fluid from flowing around the core and/or insulator along the outer sheath.

In some embodiments, the method includes the act of fixedly mounting the coupling sleeve to the outer sheath using adhesive.

If the coupling sleeve and coupling comprise complementary screw threads, the act of releasably attaching the coupling to the coupling sleeve can comprise engaging the screw threads by rotating the coupling relative to the coupling sleeve.

In some embodiments, the method includes the step of pumping pressurised fluid along the fluid pipe at a fluid pressure of up to 70 bar and preferably, at a pressure of around 45 bar.

Preferably, the method includes the act of stripping a section of outer sheath so that an end portion of the insulator is exposed at said opposite end of the cable, clamping said exposed end portion in a clamping member having a cooperating element and attaching the cooperating element to a drawing mechanism prior to activating the fluid pump and the drawing mechanism to simultaneously push the insulator and core at one end of the cable under hydraulic fluid pressure and pull the insulator and core from the other end of the cable under a pulling force.

The act of controlling the drawing mechanism may include controlling it so as to apply a pulling force of up to 170 kg to the insulator and cable via the clamping member.

In some embodiments, the method may include the act of controlling the drawing mechanism to reduce the pulling force applied to the insulator and cable after displacement of the insulator and cable has initiated.

Figure 2:
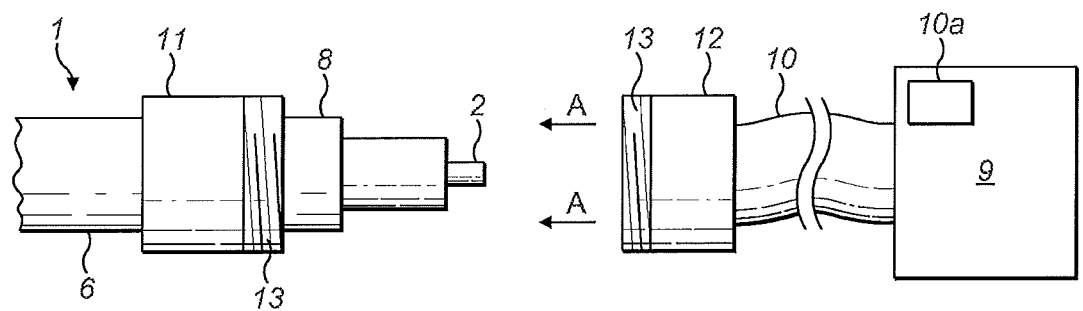
Figure 3:
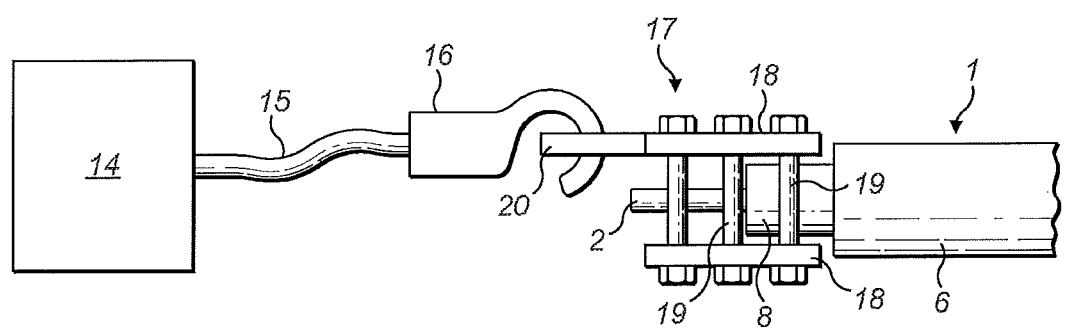

Embodiments of the invention will now be described, by way of example only, with reference to FIGS. 2 and 3 of the accompanying drawings, in which:

FIG. 1 is a perspective view of an end portion of one type of traditional copper cored cable with the various layers shown stripped back to illustrate its construction;

FIG. 2 is a side elevation showing an exposed cable end with a coupling sleeve attached thereto and a coupling at the end of a fluid supply pipe about to be attached to the coupling sleeve for the supply of pressurised fluid to the cable to apply hydraulic pressure directly to the core and insulator; and FIG. 3 is a side elevation of an opposite end of the cable showing a clamping member and winch having a hook attached to the clamping member.

As described above, a perspective view of an end of one type of conventional cable 1 is shown in FIG. 1 and comprises a single filament copper core 2 covered by an outer sheath 6 formed from a polymer material such as PVC which is lined with a metallic jacket 7 (not shown in FIGS. 2 and 3). The core 2 is received in a flexible but hard plastic insulator or isolator 8 to keep the core 2 together and to provide overall mechanical, weather, chemical and electrical protection. Cables 1 of this type are commonly used for local area networks and may be buried underground.

To extract the core 2 and insulator 8 from its sheath 6 so that the sheath 6 remains in-situ and can be re-used, access to each end of the cable 1 is provided, such as by digging a trench and cutting the cable 1. It is envisaged that the core 2 and insulator 8 may be extracted using the method and apparatus of the present invention for cable runs of 100 metres or more.

Once a decision has been made as to which end of the exposed cable the core 2 and insulator 6 is to be extracted from, an hydraulic constant pressure pump 9 capable of generating an hydraulic pressure in excess of 40 bar to 45 bar, is positioned adjacent to the opposite end. The pump 9 may be electric with a rating of 230V, 12.7 A having an accumulator recharge on 30 bar with nitrogen to provide constant pressure during pumping without fluid loss. Alternatively, a pneumatic pump having an air compressor, power generator and accumulator with 7 litre capacity with recharge on 30 bar with nitrogen may be employed. The pump 9 may be provided with a digital control unit boa to allow fluid flow, and therefore pressure, to be controlled.

The pressure pump 9 has a fluid pipe or hose to (only part of which is shown in FIG. 2), which is connected to the outer sheath 6 adjacent the end of the exposed cable 1. This is achieved by immovably attaching a coupling sleeve bb to the outer sheath 6 close to the cable end. The coupling sleeve 11 may be permanently attached to the outer sleeve 6 using adhesives or in some other way. A remote end of the fluid pipe to is provided with a coupling element 12. The coupling sleeve 11 and the coupling element 12 together include cooperating elements 13 to enable the coupling element to be releasably attached to the coupling sleeve. For example, and a shown in FIG. 2, the coupling sleeve 1b and coupling element 12 may both be provided with complementary screw threads that engage to couple the coupling element and coupling sleeve together, when the coupling element 12 is moved towards the coupling sleeve 13 (in the direction of arrow "A" in FIG. 2) and then rotated relative to the coupling sleeve 13. O-rings or other sealing elements (not shown) may be provided to prevent fluid leakage through the join between the coupling sleeve 13 and the coupling element 12 during pumping.

A drawing mechanism 14, such as a winch, is set up adjacent to the opposite end of the exposed cable 1. The drawing mechanism 14 may comprise a braided steel cable 15 having a hook 16 at one end. A short length of the core 2 and insulator 8 are exposed at the end of the cable 1 by removing a portion of the sheath 6 and metallic jacket 7. A clamping member 17 is then attached to the exposed length of the core 2 and insulator 8. The clamping member 17 may comprise a pair of plates 18 between which the exposed core 2 and insulator 8 is placed. Bolts 19, only three of which are shown in FIG. 3, are then used to sandwich the core 2 and insulator 8 between the plates 18. The clamping member 17 is provided with an integral cooperating element 20, such as a loop, onto which the hook 16 of the winch 14 may be attached so that, when the winch 14 is operated, a pulling force will be transferred to the core 2 and insulator 8 via the clamping member 17.

Once the coupling sleeve 11 and the coupling element 12 have been coupled to each other at one end of the cable 1 and, the clamping member 17 has been clamped to the opposite end of the cable 1 and the clamping member 17 attached to the winch 14, the pump 9 and the winch 14 are both switched on so that pressurised fluid, which may be vegetable oil or some other kind of fluid that is not harmful to the environment, flows along the fluid pipe 10 so as to apply direct hydraulic pressure to the exposed end of the core 2 and insulator 8. At the same time, the winch 14 applies a pulling force to the opposite end of the core 2 and insulator 8.

As it is important that pressure is applied to the end of the core 2 and insulator 8, pressurised fluid is prevented from flowing within the core 2 by sealing it with a fluid impermeable plastic tape or covering (not shown) prior to attachment of the coupling element 12 to the coupling sleeve 11.

The winch 14 should be capable of applying a pulling force of at least 170 Kg. However, once displacement of the core 2 and insulator 8 has begun, the force can be reduced gradually. Depending on the length of the cable 1 and the amount of core 2 and insulator 8 extracted, a final part of the core 2 and insulator 8 may be extracted by pulling by hand.

The apparatus may include a control unit (not shown) associated with each of the pump 9 and the winch 14.

Many modification and variations of the invention falling within the terms of the following claims will be apparent to those skilled in the art and the foregoing description should be regarded as a description of the preferred embodiments of the invention only.

The invention claimed is:

1. A method for extracting a core and surrounding insulator from an outer sheath of a length of data transmission cable, the method comprising the acts of:

generating hydraulic pressure against a first exposed end of the core and insulator, and simultaneously exerting a pulling force on an opposite second exposed end of the core and insulator to displace the core and insulator with respect to the outer sheath;

fixedly mounting a coupling sleeve to the outer sheath adjacent to the first exposed end of the core and insulator of an end of the cable and releasably attaching a coupling of a pressurized fluid supply pipe to the coupling sleeve prior to pumping pressurized fluid along said pipe so that it acts directly against the first exposed end of the core and insulator at said end of the cable; and sealing the first exposed end of the core and insulator at said end of the cable, sealing said end of the cable, prior to releasably attaching said coupling of the pressurized fluid supply pipe to the coupling sleeve and prior to pumping pressurized fluid along said pipe, so that said pressurized fluid is applied to the first exposed end of the core and insulator at said end and so as to prevent said pressurized fluid from flowing around the core and insulator along the outer sheath, wherein a length of the core is exposed at a proximal end and a distal end, and wherein a length of the insulator is exposed at a proximal end and a distal end.

2. The method according to claim 1, including the act of fixedly mounting the coupling sleeve to the outer sheath using adhesive.

3. The method according to claim 1, wherein the coupling sleeve and coupling comprise complementary screw threads and the act of releasably attaching the coupling to the coupling sleeve comprises engaging the screw threads.

4. The method according to claim 1, comprising the act of pumping pressurized fluid along the fluid pipe at a fluid pressure of up to 40 bar.

5. The method according to claim 1, comprising the act of stripping a section of outer sheath so that an end portion of the insulator is exposed at said opposite second exposed end of the core and insulator of the end of the cable, clamping said exposed end portion in a clamping member having a cooperating element and attaching the cooperating element to a drawing mechanism prior to activating the fluid pump and the drawing mechanism to simultaneously push the insulator and core at the first exposed end of the core and insulator of the end of the cable under hydraulic fluid pressure and pull the insulator and core from the second exposed end of the core and insulator of the other end of the cable under a pulling force.

6. The method according to claim 5, comprising the act of controlling the drawing mechanism to apply a pulling force of up to 170 kg to the insulator and core via the clamping member.

7. The method according to claim 6, comprising the act of controlling the drawing mechanism to reduce the pulling force applied to the insulator and core after displacement of the insulator and core has initiated.

\* \* \* \* \*